UNITED STATES PATENT OFFICE.

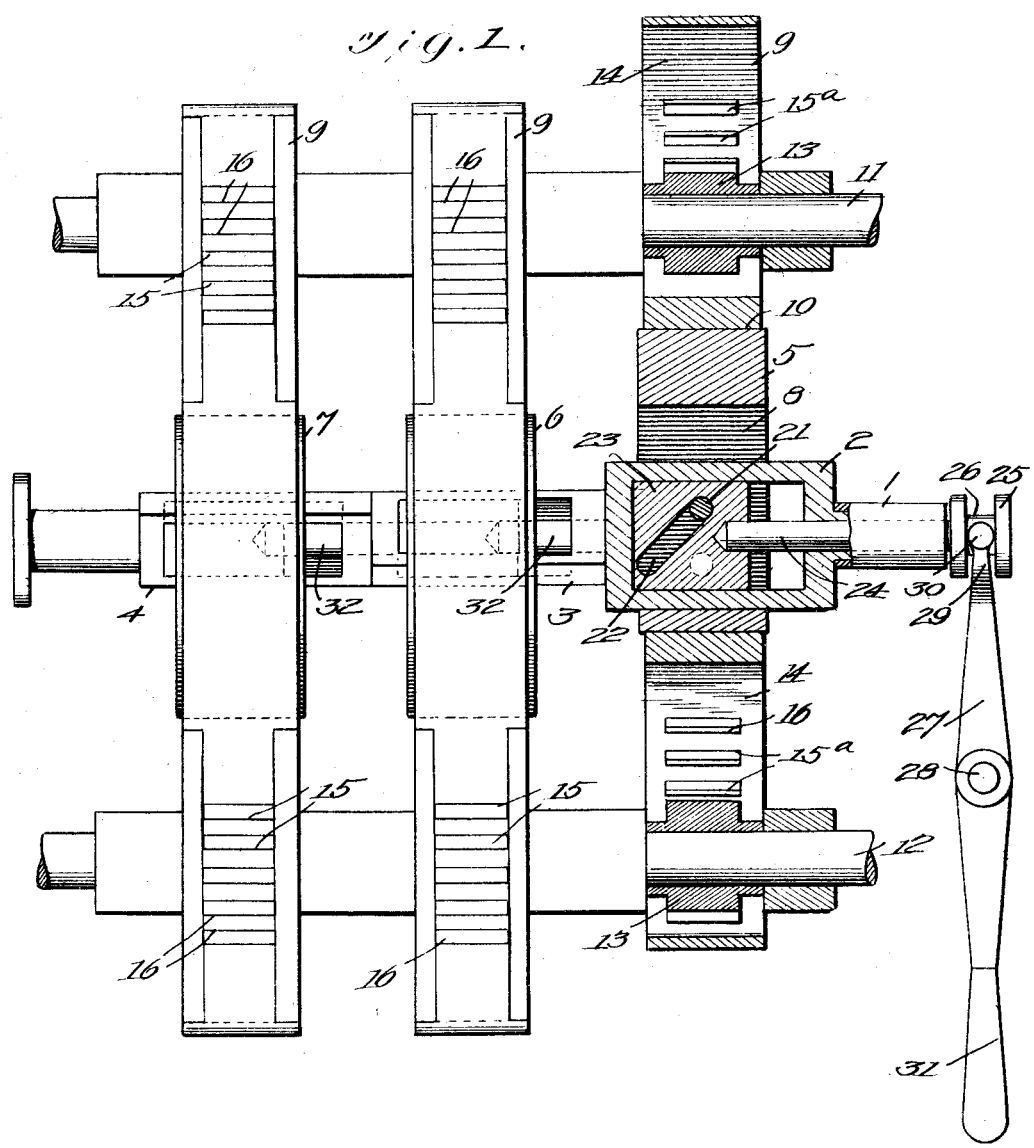

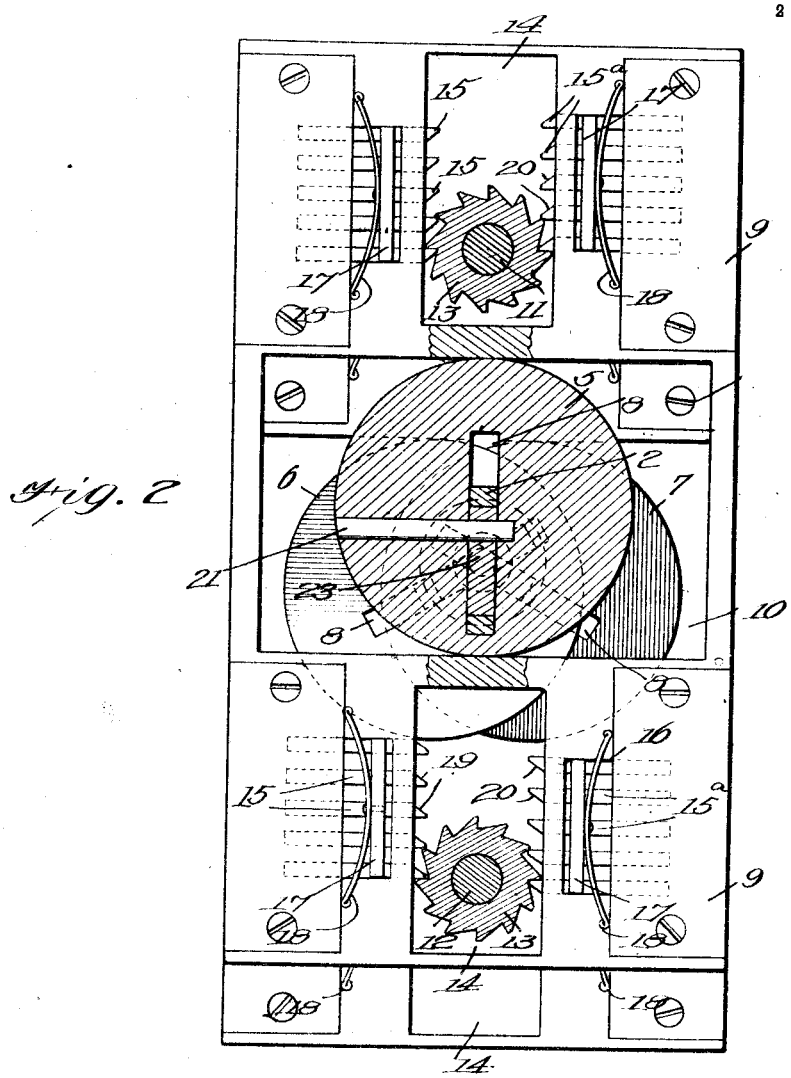

ROBERT W. J. SMITH, OF HUNTSVILLE, TEXAS.

MECHANISM FOR CONVERTING RECIPROCATING INTO ROTARY MOTION.

1,063,839.  Specification of Letters Patent.  Patented June 3, 1913.

Application filed July 8, 1912. Serial No. 708,202.

*To all whom it may concern:*

Be it known that I, ROBERT W. J. SMITH, a citizen of the United States, and a resident of Huntsville, in the county of Walker and State of Texas, have invented certain new and useful Improvements in Mechanism for Converting Reciprocating into Rotary Motion, of which the following is a specification.

My invention is an improvement in mechanism for converting reciprocating into rotary motion, and has for its object the provision of a simple device of the character specified for connecting a driving shaft with one or more driven shafts, in such manner that while the driven shafts are continuously rotated by the driving shaft, the relative speed of the driven shafts with respect to the driving shaft may be easily and quickly changed.

In the drawings: Figure 1 is a plan view of the improvement, partly in section; Fig. 2 is a side view.

In the present embodiment of the invention the main or driving shaft 1 is provided with three open rectangular frames 2—3 and 4, each of which is formed integral with the shaft, the long axes of the frames coinciding with the axis of the shaft. Cams 5—6 and 7 are mounted on the frames, each cam having a slot 8 for receiving the frame, and the slots 8 are of greater length than the width of the frame upon which the cam is mounted.

A yoke 9 is engaged by each cam, each yoke having a rectangular opening 10, in which the cam is arranged, and the cam touches opposite sides of the opening, so that when the cam rotates the yoke is reciprocated transversely of the shaft. All of the yokes are reciprocated in the same direction, and each has a driving connection with the lateral or driven shafts 11 and 12, arranged on opposite sides of the shaft 1.

A ratchet wheel 13 is secured to each shaft 11 and 12, in a rectangular opening 14, in the yoke, and each ratchet wheel is engaged by a plurality of series 15 and 15ª of teeth. The series of teeth are oppositely arranged, one series being on each side of the ratchet wheel, and of the opening 14, and all of the said teeth are mounted to slide toward and from the longitudinal axis of the yoke.

The teeth of each series are slidable in openings 16 in the yoke, and a bar 17 is held against the shoulders of the teeth of each series, each bar being arranged transversely of the teeth of the series. An arched spring 18 bears against the bar 17, at approximately the center thereof and each spring acts normally to force the teeth inwardly.

The inner end of each tooth of series 15 is beveled or inclined on its lower face, as shown at 19, while the inner end of each tooth of series 15ª is beveled or inclined on its upper face, as shown at 20. The arrangement of teeth and ratchet wheel is such that when the yoke moves toward the shaft adjacent to the teeth, the teeth of series 15ª engage and rotate the wheel, while the teeth of series 15 are pressed outwardly. On the other hand when the yoke moves toward the opposite shaft, the teeth of series 15 engage and rotate the wheel, while the teeth of series 15ª are pushed outwardly. A continuous movement in one direction is thus imparted to the two shafts 11 and 12, when shaft 1 is rotated.

Each of the cams 5, 6 and 7 is provided with a pin 21, arranged transversely of slot 8, at the point of eccentricity of the cam, and each pin 21 passes through a slot 22, extending diagonally of a block 23. Each block 23 is slidable in the frame on which the cam is mounted, longitudinally of shaft 1, and it will be evident that when the block is moved the cam belonging thereto will be shifted to increase or diminish its eccentricity.

The shaft 1 is hollow, and a rod 24 is arranged in the hollow at one end of the shaft. The inner end of rod 24 is connected to the block 23 of cam 5, and the outer end of the rod is provided with a head 25, having an annular groove 26. A lever 27 is pivoted intermediate its ends, as shown at 28, and the inner end of the lever is forked, the arms 29 of the fork having pins or rollers 30 engaging the groove 26 of the head. The outer end of the lever is provided with a grip 31, and it will be evident, that when the lever is swung the block 23 will be moved in the frame 2. The block 23 of frame 2 is connected to the said block of frame 3, and the block of frame 3 is connected to the block of frame 4, by means of rods 32, both rods being in the hollow of shaft 1. When the lever is swung, all of the blocks 23 are moved longitudinally of the shaft, and all of the cams are shifted simultaneously, to increase or diminish their eccentricity. Since the travel or speed of shafts 11 and 12 with respect to shaft 1 is dependent upon the eccentricity of the cams, the relative speed is thus varied.

A plurality of cams spaced at equal angles around the shaft 1 are made use of to insure a more uniform rotation of shafts 11 and 12. It will be evident that if there is but one cam and one yoke the shafts 11 and 12 would cease their rotation at the time of the reversal of the direction of the movement of the yoke. In fact the greater the number of cams and ratchet mechanism used, the more uniform is the rotation of the shafts 11 and 12.

The device is especially intended for use in automobiles and two driven shafts are used in order that each rear wheel may have its own shaft, thus dispensing with the necessity of a differential gear. It will be noted that either wheel, that is, that either shaft 11 and 12 may be rotated forwardly with the cams idle, therefore when going around the corner the outer wheel can rotate faster than the inner wheel, thereby avoiding the necessity of a differential gear in the rear axle.

While especially designed for use in automobiles, the device may also be used with motor vehicles of any class and with machine tools such as lathes and boring mills or any other device requiring different speeds. It will be evident that the speed of the shafts 11 and 12 varies with the eccentricity of the cams, and therefore the speed of the vehicle is proportional to the eccentricity of the cam. It will be also evident that an infinite number of speeds may be obtained without any sudden transition from one speed to the other or any clattering of gears so common with the present type of gears, when changing from one speed to the other.

I claim:

1. In combination, a driving shaft, a driven shaft on each side thereof, the driving shaft having a plurality of substantially rectangular guide frames interposed in its length, each frame having its long axis in the axis of the shaft and its narrow axis transverse to the shaft, a block slidable in each frame longitudinally of the shaft, a cam wheel for each frame, each wheel having a slot for receiving the frame, the slot being of greater length than the width of the frame, a pin arranged transversely of the slot of each cam and passing through the slot of the block in the adjacent frame, a connection between the frames, the driving shaft being hollow, and said connection being in the hollow of the shaft, a rod connected to one end frame and extending out of the shaft, a lever pivoted intermediate its ends and having one end rotatably connected to the rod, a yoke plate for each cam, each plate having a central rectangular opening for receiving the cam, and end openings for receiving the driven shafts, the cam engaging opposite sides of the central opening of the yoke to reciprocate said yoke toward and from the driven shafts, and a driving connection between each yoke and the driven shafts for continuously rotating the said shafts in one direction when the yoke is reciprocated.

2. In combination, a driving shaft, a driven shaft on each side thereof, the driving shaft having a plurality of substantially rectangular guide frames interposed in its length, each frame having its long axis in the axis of the shaft and its narrow axis transverse to the shaft, a block slidable in each frame longitudinally of the shaft, a cam wheel for each frame, each wheel having a slot for receiving the frame, the slot being of greater length than the width of the frame, a pin arranged transversely of the slot of each cam and passing through the slot of the block in the adjacent frame, means for simultaneously moving the blocks, a yoke for each cam, each yoke having an opening for the cam, the cam engaging opposite sides of the opening, and being reciprocated by the rotation of the cam, and a driving connection between each yoke and the driven shafts for continuously rotating said shafts in one direction when the yokes are reciprocated.

3. In combination, a driving shaft, said shaft having three rectangular guides extending longitudinally of the shaft, a block movable in each guide longitudinally of the shaft, each block having a slot inclined to the shaft, a cam for each guide, each cam having a slot for the guide of greater length than the width of the guide, each cam having a pin extending through the slot of the adjacent block, means for simultaneously moving the blocks, a driven shaft on each side of the driving shaft, and means operated by the rotation of the cams for continuously rotating the driven shafts in one direction, said means comprising a plate for each cam, each plate having an opening for the cam and an opening for each driven shaft, the cam engaging the sides of the opening adjacent to the driven shafts, a ratchet wheel on each driven shaft in the opening of the plate, a series of teeth slidable in the plate on each side of each ratchet wheel, and springs compressing each series toward the ratchet wheel, the teeth of one series being beveled at their inner ends on the side adjacent to the driven shaft, and the teeth of the other series being beveled at their inner ends on the side remote from the driving shaft.

4. In combination, a driving shaft, said shaft having three rectangular guides extending longitudinally of the shaft, a block movable in each guide longitudinally of the shaft, each block having a slot inclined to the shaft, a cam for each guide, each cam having a slot for the guide of greater length than the width of the guide, each cam having a pin extending through the slot of the adjacent block, means for simultaneously moving the blocks, a driven shaft on each side of the driving shaft, and means operated by the rotation of the cams for continuously rotating the driven shafts in one direction, said means comprising a ratchet wheel on each of the driven shafts, a yoke plate connected with each cam and reciprocated toward and from the driven shafts by the cam, a series of teeth slidable on the plate on each side of each ratchet wheel, one of the said series having their inner ends beveled on one side, and the other series having their inner ends beveled on the opposite side.

5. In combination, a driving shaft, said shaft having three rectangular guides extending longitudinally of the shaft, a block movable in each guide longitudinally of the shaft, each block having a slot inclined to the shaft, a cam for each guide, each cam having a slot for the guide of greater length than the width of the guide, each cam having a pin extending through the slot of the adjacent block, means for simultaneously moving the blocks, a driven shaft on each side of the driving shaft, and means operated by the rotation of the cams for continuously rotating the driven shafts in one direction.

6. In combination, a driving shaft, said shaft having a guide extending longitudinally thereof, a block movable in the guide longitudinally of the shaft, said block having a slot inclined to the shaft, means for moving the block, a cam having a slot for the guide of greater width than the width of the guide, a pin extending transversely of the slot of the cam and passing through the slot of the block, a driven shaft on each side of the driving shaft, and means operated by the rotation of the cam for continuously rotating the driven shafts in one direction, said means comprising a plate having an opening for the cam and an opening for each driven shaft, the cam engaging the sides of the opening adjacent to the driven shafts, a ratchet wheel on each driven shaft in the opening of the plate, a series of teeth slidable in the plate on each side of each ratchet wheel, the teeth of one series having their inner ends beveled on one side, and the teeth of the other series having their inner ends beveled on the opposite side, and springs pressing each series toward the ratchet wheel.

7. In combination, a driving shaft, said shaft having a guide extending longitudinally thereof, a block movable in the guide longitudinally of the shaft, said block having a slot inclined to the shaft, means for moving the block, a cam having a slot for the guide of greater length than the width of the guide, a pin extending transversely of the slot of the cam and passing through the slot of the block, a driven shaft on each side of the driving shaft, and means operated by the rotation of the cam for continuously rotating the driven shafts in one direction, said means comprising a plate having an opening for the cam and an opening for each driven shaft, the cam engaging the sides of the opening adjacent to the driven shafts, a ratchet wheel on each driven shaft in the opening of the plate, and means on the plate for engaging the ratchet wheel and rotating the same when the plate is reciprocated.

8. In combination, a driving shaft, said shaft having a guide extending longitudinally thereof, a block movable in the guide longitudinally of the shaft, said block having a slot inclined to the shaft, means for moving the block, a cam having a slot for the guide of greater length than the width of the guide, a pin extending transversely of the slot of the cam and passing through the slot of the block, a driven shaft on each side of the driving shaft, and means operated by the rotation of the cam for continuously rotating the driven shafts in one direction.

9. In combination, a driving shaft, said shaft having a guide extending longitudinally thereof, a block movable in the guide longitudinally of the shaft, said block having a slot inclined to the shaft, means for moving the block, a cam having a slot for the guide of greater length than the width of the guide, a pin extending transversely of the slot of the cam and passing through the slot of the block, a driven shaft, and means operated by the rotation of the cam for continuously rotating the driven shaft in one direction.

10. In combination, a driving shaft, a driven shaft, a cam on the driving shaft, said cam having a transverse slot intersecting the center of eccentricity, means on the shaft engaging the slot for constraining the cam to rotate with the shaft, a pin arranged transversely of the slot at the center of eccentricity of the cam, means engaging the pin for moving the cam with respect to the shaft to vary the eccentricity of the cam with respect to the shaft, and a connection between the cam and the driven shaft for rotating the driven shaft in the same direction as the driving shaft.

ROBERT W. J. SMITH.

Witnesses:
H. D. Thompson,
W. H. Lewis.